United States Patent Office 2,786,821
Patented Mar. 26, 1957

2,786,821

COMPOSITION FOR COLORING DORMANT GRASS

Henry A. Gardner, Chevy Chase, and Richard Watson, Bethesda, Md.

No Drawing. Application February 2, 1955,
Serial No. 485,824

1 Claim. (Cl. 260—29.6)

This invention relates to the coloring of dormant grasses, e. g., dormant Bermuda grass, in situ, whereby to give the winter color of the grass blades and stems a pleasing green coloration, and is particularly concerned with the provision of substantially a long period coloration to such dormant grasses. While not restricted thereto, the invention finds special application to the treatment of greens and fairways of golf courses during fall and winter months, and will be described herein with particular reference to the latter.

Along the Atlantic coast, from North Carolina to Florida and west as far as Texas, the greens and fairways of the better golf courses are planted almost exclusively to Bermuda grass, and the same is true of recreation areas and private lawns in this geographical location. On such areas, the above-ground parts of Bermuda grass turn brown with the first heavy frost and remain the winter color until spring, making for unsightliness. It is conventional in the fall of the year, in the aforesaid areas, to sow cool-weather grasses such as rye or red top, to replace the dormant Bermuda grass, with the object of providing a green color thereon through the winter months. Thus, at certain southern golf courses it has been accepted practice to sow the Bermuda grass areas to rye at the rate of from 50 to 100 pounds of rye grass seed per 1000 square feet of area. This treatment entails not only the expenditure for seed but also a very considerable labor cost for the necessary work in preparing the seed bed for sowing, since the Bermuda grass turf must be scarified and top dressed to receive the seeding of cool weather grasses, fertilizer must be added, fungicides employed, and the seeded areas again topdressed and frequently watered. Such preparatory work necessarily involves considerable disturbance of the Bermuda grass root systems. Moreover, germination of the rye may be "spotty," and at best there is a waiting period of from ten days to two weeks between seeding and the development of color.

At best, the playing surfaces of greens so treated are expensive to up-keep from fall until the Bermuda grass again becomes established in the spring and until the cool weather grasses disappear from the treated areas. During such transition from winter grasses to Bermuda grass, which may extend over two or three months, the cool weather grasses disappear gradually and non-uniformly, with the result that the greens and fairways are "spotty" not only in coloration but also in playing texture, necessarily making for poor putting until the cool weather grasses have disappeared from the greens and the new Bermuda grass has become well established in the late spring. Furthermore, it is often necessary to do spot-sowing with Bermuda seed during the transition period.

It is an object of the present invention to obviate the disadvantages inherent in the above mode of maintaining greens, fairways and similar areas planted to Bermuda grass and similar grasses prone to be brown during the months of dormancy. It is a further inventive object to provide an economical and quickly performed treatment of dormant grasses whereby to confer upon the same a natural-looking long-lasting (weather-fast, substantially non-fading), green coloration without alteration of the playing texture of the green or fairway so treated and without any injury to or disturbance of the turf per se and without altering the soil in which the turf is established.

According to the present invention, the above-ground parts of dormant Bermuda grass are treated (coated) with an aqueous dispersion containing (a) a water-insoluble pigment of green color, e. g., chromium hydroxide or Chrome Green (a mixture of lead chromate and Prussian Blue), or green toner, (b) a water-soluble organic color, and (c) a water-dispersible, substantially colorless binder for the other two components, which binder is, or after application to the dormant parts becomes, substantially water-insoluble. Such dispersion is applied to the dormant grass parts by spraying, and in a relatively small amount sufficient to impart a desirable green coloration to the dormant grass parts. As will be readily understood, the amount of dispersion employed, per unit area of turf, is not critical: from the experience gained in a great many experiments it appears that a desirable result is attained through the use of approximately 2 or 3 ounces, dry weight, of the dispersion per each 100 square feet of area of the dormant Bermuda grass.

The durability of the coloring composition of the present invention, in situ on dormant grass parts, can be accurately measured as follows: After treatment with the dispersion, a 4-inch plug of the turf is removed and its coloration determined by the use of a Gardner automatic color difference meter showing, in figures, the exact amount of the brightness, greenness and yellowness of the coloration. A month (more or less) later, a second 4-inch plug of the treated turf is removed and similarly tested as to brightness, greenness and yellowness, thereby measuring the amount, if any, of fading which had taken place.

The invention will now be described in greater particularity and with reference to the following specific examples.

*Example 1*

3 ounces of dry mixture of—

|  | Parts |
|---|---|
| Naphthol B Green (a product of General Dyestuff Corp.), a water-soluble organic color | 120 |
| Light Chrome Green, a water-insoluble inorganic piment | 20 |
| Calcium hydrate | 36 |
| Casein powder (dry) | 24 | was dispersed in 6 gallons of water, and the resulting dispersion was sprayed onto a test area 100 square feet of undisturbed dormant Bermuda grass. The resulting coating dried readily, the color substance coloring the grass parts and the casein and calcium hydrate uniting to yield a substantially water-insoluble binding film coating over the color and securing the inorganic pigment particles to the grass parts. The binder prevented the washing off of the color.

The so-treated test area of turf, which initially was characterized by a pleasing green coloration akin to that of active Bermuda grass, was periodically observed for change of color (e. g., fading) and also to determine the fastness of the coloration with respect to water. The coating did not appreciably change color in an observation period of three months, and did not, when wetted (as by sprinkling or by rain), color the shoes or clothing of a player or the player's golf equipment.

The immediately preceding observations are reported because it heretofore had been found that when dormant Bermuda grass had been coated (e. g., by spraying) with an aqueous dispersion of water-soluble green dye in which water-insoluble binding agent had not been employed, the green color, when wetted, readily "wiped off" onto a player's shoes and clothing and onto his golf equipment.

In repetitions of the above example, it was found that the Chrome Green component could, without significant difference in result, be substituted by an equal weight of chromium hydroxide.

*Example 2*

In another procedure the formulation was, in parts by weight, as follows:

| | Parts |
|---|---|
| Naphthol B Green (water-soluble organic color) | 800 |
| Light Fast Yellow (water-soluble organic color; a product of General Dyestuff Corp) | 400 |
| Chromium hydroxide (water-insoluble inorganic color) | 50 |

One pound of this admixture was dispersed in water, and to the dispersion there was added a synthetic latex binder consisting essentially of emulsified acrylic acid polymer (specifically the product known to the trade as "Rhoplex"). For one pound of the above formulation dispersed in about 50 gallons of water there was used one pound of the above synthetic latex. The resulting dispersion was sprayed onto dormant Bermuda grass covering an area of 1000 square feet. Upon drying on the grass blades, the polymer became water-insoluble and functioned as a binder which effectively prevented rain from dissolving or removing the green coloring matter from the dormant grass parts so treated. The coloration persisted, with only insigificant fading, throughout a period of approximately 3 months.

In a repetition of the above experiment in which the binder was omitted, it was found that the initial coloration of dormant grass parts treated therewith was good, but that the coating tended to wash off in a rain storm.

It was found, in further repetition of this experiment, that natural or other synthetic rubber latex such as emulsions of polyvinyl acetate or butadiene styrene polymers could be substituted for the acrylic polymer latex.

*Example 3*

| | Parts by weight |
|---|---|
| Naphthol B Green (water-soluble organic color) | 800 |
| Light Fast Yellow (water-soluble organic color) | 300 |
| Victoria Green (water-soluble organic color) | 50 |
| Chromium hydroxide (water-insoluble inorganic color) | 50 |

Three pounds of the above formulation were dispersed in 100 gallons of water, and 3 pounds of synthetic latex (acrylic polymer), solids 46%, were added to the dispersion and homogeneously admixed therewith. The resulting dispersion was sprayed onto a test area of turf of dormant Bermuda grass amounting to about 6000 square feet. Upon drying, the latex coagulated into an adhesive film covering and binding the coloring matter to the dormant grass parts so treated. A few hours after drying, an intense rain failed to remove the color of the treated grass.

In further exposition of the above-mentioned method of measuring the fastness or durability of the green coating on dormant grass parts, the following additional information is given about the use of the Gardner automatic colorimeter:

This colorimeter is a tristimulus colorimeter measuring color on three scales to determine either the color difference between two objects or the color of an object related to a standard.

The exposure head houses a type 1209 auto lamp with lenses and mirrors which divide the beam and cause each section to strike the sample at 45° angle of incidence. Light diffused perpendicularly from the sample passes through a fluted lens into a sphere lined with magnesium oxide. The sphere is provided with three apertures allowing light to pass out to each of three filter-photocell combinations. This light, impinging upon the photocells, creates a current proportional to its intensity. The signal is transmitted to the measuring unit, where three helipots are, in turn, automatically motor driven to balance. Duodials mounted on the front panel are directly coupled to the helipots and the readings obtained from them giving the colorimetric specification of the sample.

By removing four inch circular plugs of grass sod from a golf course or other area which has been treated with color, it is possible to read these plugs for color value and keep an accurate record of the color to determine whether changes take place from time to time.

These plugs are read for reflectance, greenness and yellowness. Thus, for instance, plugs of normal Bermuda grass in the winter months usually show a reading of about 20% reflectance, a greenness of 2.0 and a yellowness of 11.8, whereas such Bermuda grass in the summer months will probably show, according to the different seasons, about 10% reflectance, a greenness of −10 to −16 and a yellowness of +12 to +17.

The formulations outlined in this specification have all fallen within this range and have maintained their color for substantial periods. A large number of test Bermuda turf plots which we have treated with colors such as are described in this specification were plugged after treatment and again subsequently after exposure for various periods, to determine any degree of fading which might take place. In such tests, if fading has occurred, the brightness of the samples would increase and the greenness and yellowness usually show slight decrease. We have seldom found more than 10% overall fading in any of the formulas outlined, even after exposure for 4 to 8 weeks.

Tests of the use of the coloring substances, above described, on dormant and on growing Bermuda grass have demonstrated that the same are not poisonous to the root systems and do not injure growing grass blades.

We claim:

A sprayable aqueous coating composition containing a water-insoluble inorganic pigment of green color, a water-soluble organic color and an emulsion of a normally insoluble organic binder material of the group consisting of acrylic acid polymer, butadiene-styrene polymer and polyvinyl acetate, the ratio of inorganic green pigment to organic color being from about 1:6 to about 1:24 and the total content by weight of color components being approximately twice the content of solids of binder material, which when sprayed upon dormant grass at a concentration of from 2 to 3 ounces of the solids content to 100 square feet of grass turf will color the grass so that it will show a brightness of 10–15%, a greenness of from −10 to −16 and a yellowness of from +12 to +17.

References Cited in the file of this patent

UNITED STATES PATENTS

| 1,194,608 | Eastman | Aug. 15, 1916 |
| 1,931,325 | Pillsbury | Oct. 7, 1933 |
| 1,962,667 | Moore | June 12, 1934 |
| 2,113,625 | Monteith | Apr. 12, 1938 |
| 2,126,321 | Freudenberg et al. | Aug. 9, 1938 |
| 2,687,384 | Weisberg | Aug. 24, 1954 |

FOREIGN PATENTS

| 295,052 | Great Britain | July 11, 1929 |

OTHER REFERENCES

Condensed Chemical Dictionary, 1942, p. 188.